United States Patent
Singh et al.

(10) Patent No.: US 8,886,395 B2
(45) Date of Patent: Nov. 11, 2014

(54) DYNAMIC TIRE SLIP ANGLE ESTIMATION SYSTEM AND METHOD

(71) Applicant: The Goodyear Tire & Rubber Company, Akron, OH (US)

(72) Inventors: Kanwar Bharat Singh, Stow, OH (US); Anthony William Parsons, Domeldange (LU); Marc Engel, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 36 days.

(21) Appl. No.: 13/795,691

(22) Filed: Mar. 12, 2013

(65) Prior Publication Data

US 2014/0277926 A1  Sep. 18, 2014

(51) Int. Cl.
G06F 11/30 (2006.01)
B60C 23/04 (2006.01)
B60T 8/172 (2006.01)
B60C 23/06 (2006.01)
B60C 23/00 (2006.01)

(52) U.S. Cl.
CPC .......... B60C 23/04 (2013.01); *B60C 23/00* (2013.01); *B60T 8/1725* (2013.01); *B60T 2230/02* (2013.01); *B60T 2240/06* (2013.01); *B60T 2270/86* (2013.01); B60C 23/06 (2013.01)
USPC ............... 701/34.4; 701/31.4; 340/426.33; 340/442

(58) Field of Classification Search
CPC ..... B60C 23/00; B60C 19/00; G01M 17/022; B60G 17/019; B60G 2400/106; B60G 2400/0513; G01M 17/06
USPC .......... 701/30.7, 31.2, 31.4, 34.4, 45; 340/426.33, 439, 442
See application file for complete search history.

(56) References Cited

U.S. PATENT DOCUMENTS

| 7,546,764 B2 | 6/2009 | Morinaga et al. ............. 73/146 |
| 7,552,628 B2 | 6/2009 | Mancosu et al. .............. 73/146 |
| 2002/0029640 A1* | 3/2002 | Shirato et al. ................. 73/795 |
| 2006/0190150 A1 | 8/2006 | Milot ............................ 701/38 |

(Continued)

FOREIGN PATENT DOCUMENTS

| DE | 10059030 | 6/2001 | ............ G62D 37/00 |
| DE | 102006009682 | 9/2007 | ............ G01M 17/00 |
| EP | 1862425 | 12/2007 | ............... B67C 3/00 |
| WO | WO2011/054363 | 5/2011 | ......... B60G 17/0165 |

OTHER PUBLICATIONS

European Search Report received by Applicants May 26, 2014.

*Primary Examiner* — Gertrude Arthur Jeanglaude
(74) *Attorney, Agent, or Firm* — Richard B. O'Planick

(57) ABSTRACT

A dynamic slip angle estimation system and method uses measured vehicle acceleration and yaw rate parameters in estimating a tire slip angle. From load sensor(s) mounted to the vehicle tire, a tire static load estimation is made and a tire slip angle is calculated at low frequency. The vehicle center of gravity longitudinal position and yaw moment of inertia is estimated from the static load on the vehicle tires. An observer calculates tire axle forces based on the vehicle acceleration and yaw rate. From the tire axle force estimations, the vehicle moment of inertia and vehicle center of gravity longitudinal position estimate and a low frequency direct measurement of the tire slip angle, a dynamic tire slip angle calculation is made.

11 Claims, 8 Drawing Sheets

(56) References Cited

U.S. PATENT DOCUMENTS

2008/0103659 A1    5/2008  Mancosu et al. ................ 701/41
2009/0055040 A1    2/2009  Nagaya .......................... 701/29
2010/0131145 A1    5/2010  Ryu et al. ....................... 701/29
2011/0199201 A1    8/2011  Brusarosco et al. .......... 340/438

* cited by examiner

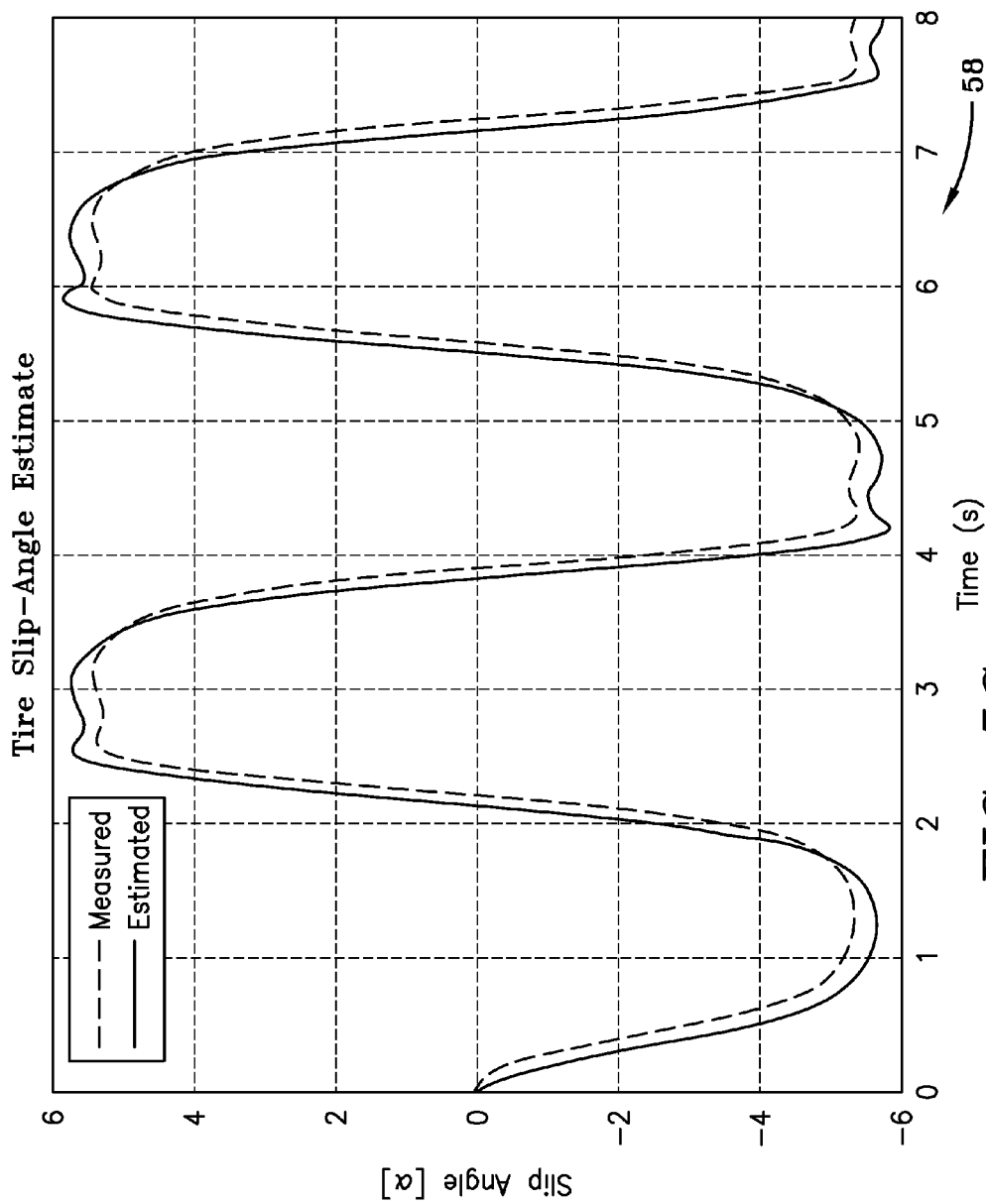

DYNAMIC TIRE SLIP ANGLE ESTIMATION SYSTEM AND METHOD

FIELD OF THE INVENTION

The invention relates generally to tire monitoring systems for collecting measured tire parameter data during vehicle operation and, more particularly, to a system and method for estimating tire slip angle based upon such measurements.

BACKGROUND OF THE INVENTION

Vehicle-mounted tires may be monitored by tire pressure monitoring systems (TPMS) which measure tire parameters such as pressure and temperature during vehicle operation. Data from TPMS tire-equipped systems is used to ascertain the status of a tire based on measured tire parameters and alert the driver of conditions, such as low tire pressure or leakage, which may require remedial maintenance. Sensors within each tire are either installed at a pre-cure stage of tire manufacture or in a post-cure assembly to the tire.

Other factors such as tire slip angle are important considerations for vehicle operation and safety. It is accordingly further desirable to measure tire slip angle and communicate slip angle information to vehicle control systems, such as electronic stability control and braking systems, in conjunction with the measured tire parameters of pressure and temperature.

SUMMARY OF THE INVENTION

According to an aspect of the invention a dynamic slip angle estimation system and method is provided for estimating a tire slip angle. The term "dynamic" means a high frequency. The system includes vehicle sensor device(s) mounted to the vehicle for measuring vehicle acceleration and yaw rate parameters; and load sensor(s) mounted to the vehicle tire for estimating a tire static load. From the tire static load estimate, a vehicle center of gravity longitudinal position and yaw moment of inertia estimation is made. An observer is employed to predict vehicle tire axle forces from the estimated center of gravity longitudinal position, vehicle yaw moment of inertia and a measure of the vehicle acceleration and yaw rate.

In another aspect, the system and method estimates a vehicle center of gravity longitudinal position and vehicle yaw moment of inertia from the static load estimation.

The system and method, in a further aspect, performs a direct measurement of the tire slip angle from the tire at a low frequency and makes the dynamic (high frequency) tire slip angle estimation utilizing the direct tire slip angle measurement (at low frequency) as a feedback parameter.

According to another aspect, the observer uses as observed inputs the measured vehicle acceleration and yaw rate and produces an output the tire axle forces based on the observed inputs. The tire slip angle calculation uses the tire axle forces and the direct tire slip angle measurement as a feedback parameter.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" or "controller area network" is a vehicle bus standard designed to allow microcontrollers and devices to communicate with each other within a vehicle without a host computer. CAN bus is a message-based protocol, designed specifically for automotive applications.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance—when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications "Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Slip Angle" is the angle between a vehicle's direction of ravel and the direction in which the front wheels are pointing. Slip angle is a measurement of the deviation between the plane of tire rotation and the direction of travel of a tire.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 5C is a graph comparing measured to estimated slip angle over time.

DETAILED DESCRIPTION OF THE INVENTION

Figure 1A:
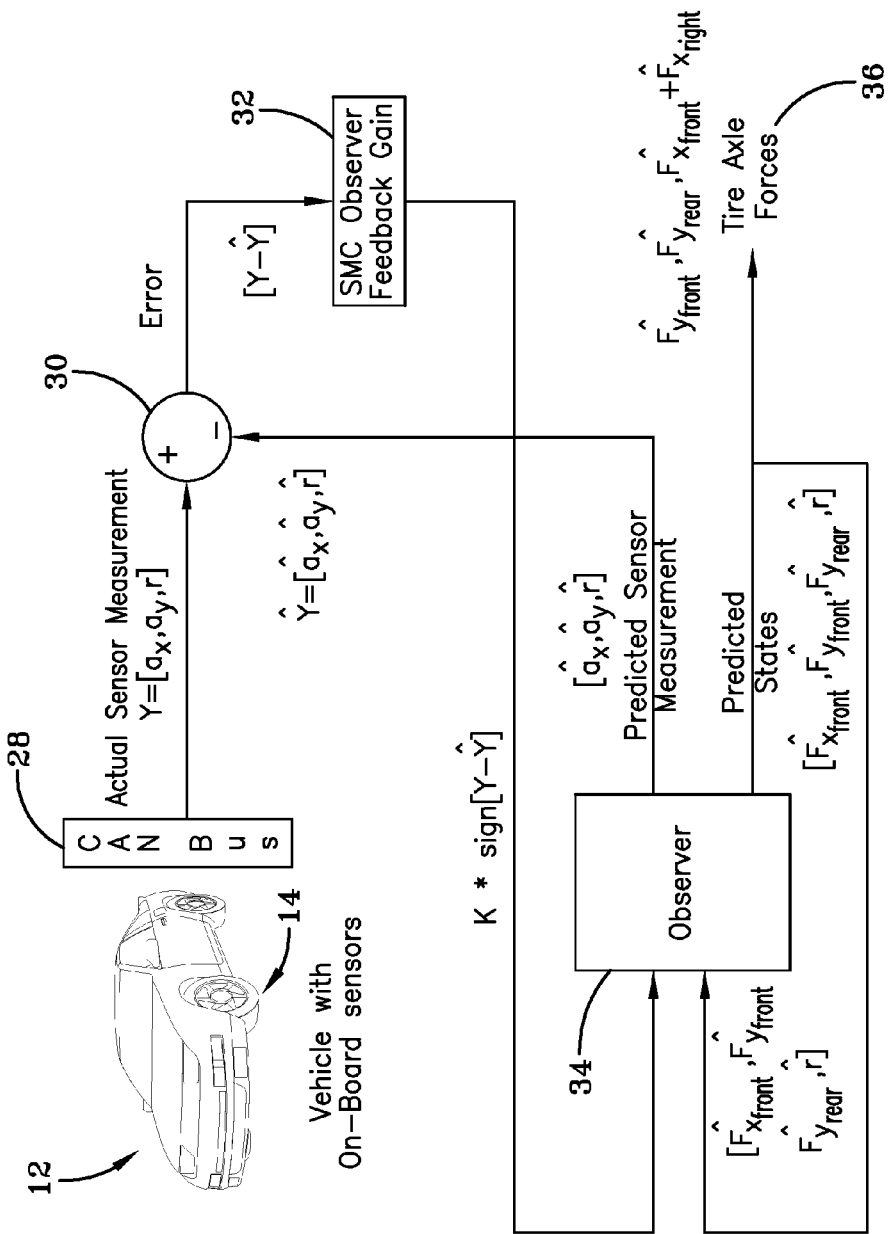
FIGS. 1A and 1B show a Tire-road Force State Estimator block diagram.

The subject dynamic tire slip-angle estimation system and method for vehicles that are equipped with on-board sensors and a Vehicle Stability Control system (VSC). Such state of the art vehicle control systems typically provide on-board sensors for measuring vehicle acceleration $a_x$, $a_y$ and yaw rate "r" and communicate data indicative of such measurements by means of a CAN bus. The invention provides an online nonlinear axle-force estimator that uses such sensor information available in VSC cars. The axle-force estimator thus provides a dynamic estimate of vehicle slip-angle. The dynamic slip angle information may be used in advanced vehicle systems such as braking and electronic stability control systems. In order to find dynamic tire axle forces, a static load measurement is made for each vehicle tire. From the static load measurement, the vehicle center of gravity longitudinal position and vehicle yaw moment of inertia is identified. An observer or estimator is employed to estimate tire axle forces and uses sensor information that is available in cars equipped with VSC.

For a better understanding of the invention system and methodology, an understanding of vehicle CAN bus systems is provided. A "CAN bus" is a multi-master broadcast serial standard for connecting electronic control units (ECU's). Each node is able to send and receive messages, but not simultaneously. A message consists primarily of an ID (identifier), which represents the priority of the message, and up to eight data bytes. It is transmitted serially onto the bus. This signal pattern is encoded in non-return-to-zero (NRZ) and is sensed by all nodes.

The devices that are connected by a CAN network are typically sensors, such as acceleration ($a_x$, $a_y$), yaw rate sensors, actuators and other control devices. These devices are not connected directly to the bus, but through a host processor and a CAN controller. If the bus is free, any node may begin to transmit. If two or more nodes begin sending messages at the same time, the message with the more dominant ID (which has more dominant bits, i.e., zeroes) will overwrite other nodes' less dominant IDs, so that eventually (after this arbitration on the ID) only the dominant message remains and is received by all nodes. This mechanism is referred to as priority based bus arbitration. Messages with numerically smaller values of IDs have higher priority and are transmitted first.

Each node requires a host processor to decide what received messages mean and which messages it wants to transmit itself. Sensors, actuators and control devices can be connected to the host processor. The CAN controller stores received bits serially from the bus until an entire message is available, which can then be fetched by the host processor (usually after the CAN controller has triggered an interrupt). The host processor stores its transmit messages to a CAN controller, which transmits the bits serially onto the bus. A transceiver adapts signal levels from the bus to levels that the CAN controller expects and has protective circuitry that protects the CAN controller. Bit rates to 1 Mbit/s are possible at network lengths below 40° m. Decreasing the bit rate allows longer network distances (e.g., 500° m at 125 Kbit/s).

Figure 4:
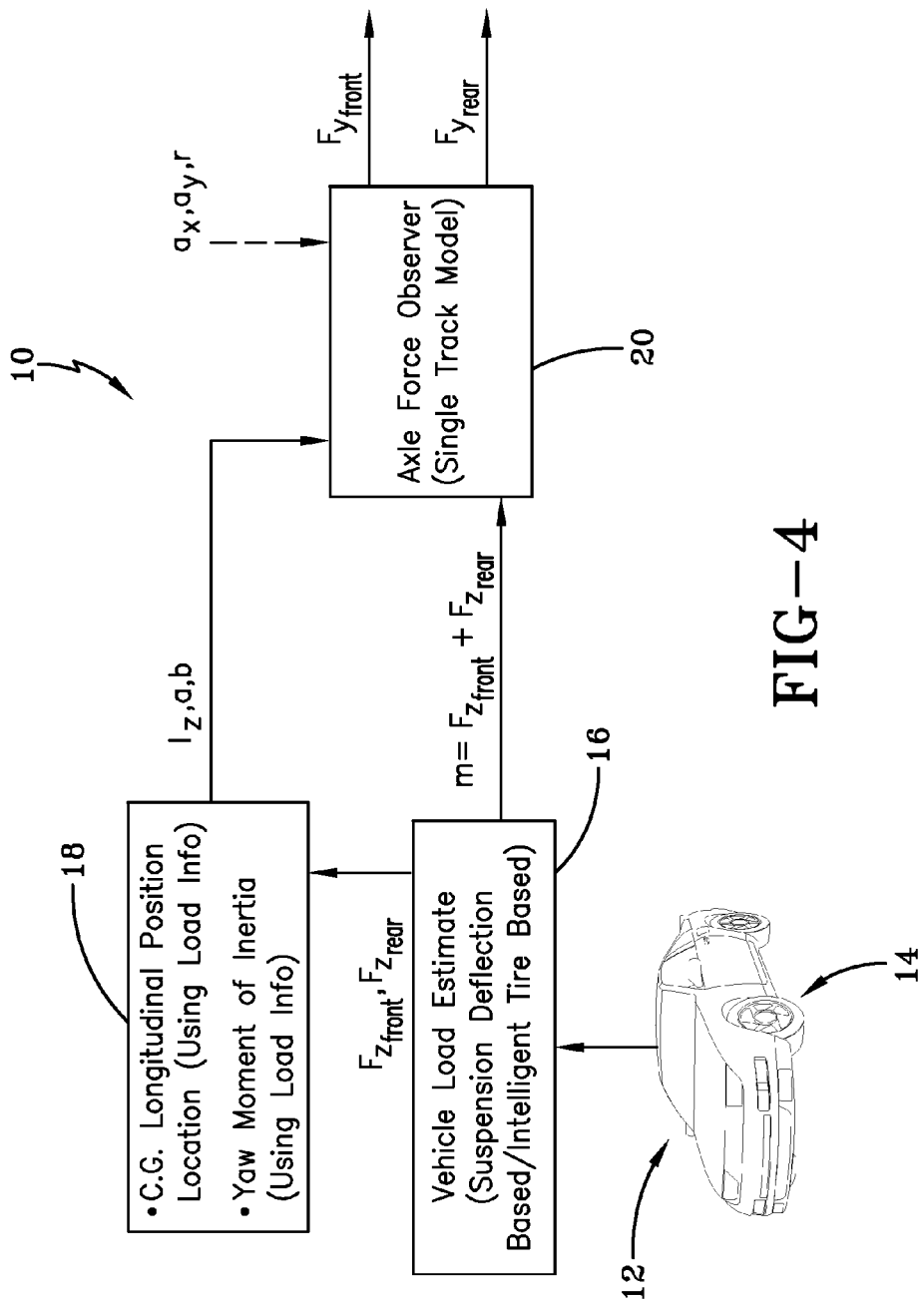
FIG. 4 flow diagram showing the use of load estimation in generating vehicle center of gravity longitudinal position and moment of inertia and the use of such parameters by an axle force single track model observer.

Referring initially to FIG. 4, an axial force, single track model, system is shown. A vehicle 12 is equipped with multiple "intelligent" tires 14. Each tire 14 is equipped with sensors for measuring tire pressure and temperature, as well as a static load sensor system. A system and method of estimating a static load on a vehicle tire is provided in co-pending U.S. patent application Ser. No. 13/609,695, filed Sep. 11, 2012, entitled "TIRE SIDEWALL LOAD ESTIMATION SYSTEM AND METHOD", incorporated herein in its entirety by reference. Disclosed therein is a system which includes an inflation pressure measuring sensor attached to the tire for measuring a tire cavity inflation pressure level; and one or more piezofilm deformation measuring sensors mounted to each of the tire sidewalls. The deformation measuring sensor(s) generate within the tire footprint a deformation signal having signal power level indicative of a level of sidewall deformation within the footprint contact patch. Power-to-load maps adjusted for tire inflation pressure are generated and stored for the tire, the maps correlating a range of load levels to a range of signal power levels whereby operatively enabling a load level to be identified for each signal power level on an inflation pressure adjusted basis. In the multi-sensor system embodying deformation measuring sensor(s) mounted to each sidewall, an average of the signal power level from each sensor is used in referencing the power-to-load maps in order to identify a tire load estimate.

Figure 3:
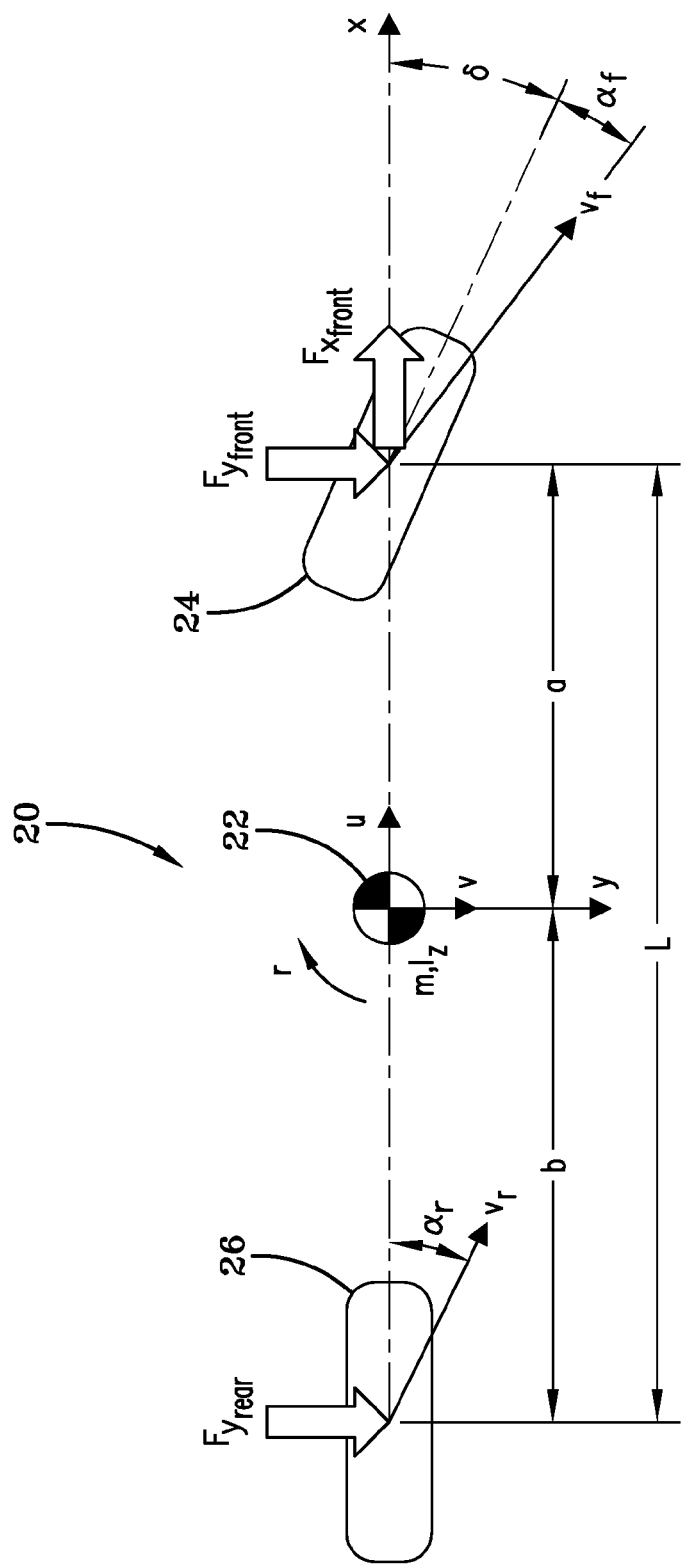
FIG. 3 is a diagram of the single track vehicle model of the observer employed in making an estimation of axial forces.

The vehicle load estimate 16, derived from sidewall deflection analysis, identifies $F_{Zfront}$ and $F_{Zrear}$ values which are then used in the calculation 18 of: the vehicle center of gravity ("CG") longitudinal distances (a, b); and yaw moment of inertia $I_z$. Vehicle mass "m" is further identified as the sum of $F_{Zfront}$ and $F_{Zrear}$. An axle force observer, single track model 20 receives as input the vehicle mass "m", yaw moment of inertia, and center of gravity as identified by chassis longitudinal distance values (a, b). The observer 20 estimates are based on the input parameters; and the output $F_{Yfront}$ and $F_{Yrear}$ lateral force parameters. FIG. 3 shows the axle force observer, single track model employed in which the following parameters are present:

r=yaw rate
$I_z$=yaw moment of inertia
u=vehicle longitudinal velocity
v=vehicle lateral velocity
a=CG to front axle distance
b=CG to rear axle distance
L=wheel base
$F_{xfront}$=front axle longitudinal force (assuming a forward wheel drive vehicle-$F_x$=0)
$F_{yfront}$=front axial lateral force
$F_{yrear}$=rear axle lateral force
m=vehicle mass
alpha_f=front slip angle
alpha_r=rear slip angle
delta=road wheel handle In the model shown by FIG. 3, the front axle 24 and the rear axle 26 are positioned respective distances (a, b) from the Center of Gravity (CG) 22. The system 10 utilizes the observer 20 (single track model of FIG. 3) to estimate without the use of feedback the axle forces $F_{yfront}$ and $F_{yrear}$ which are then used to calculate the CG of the vehicle through distances (a, b). The model of FIG. 3 is used by the observer 20 which may be selected from conventional mathematical tools such as a Kalman filter or a Luenberger Observer.

Figure 1B:
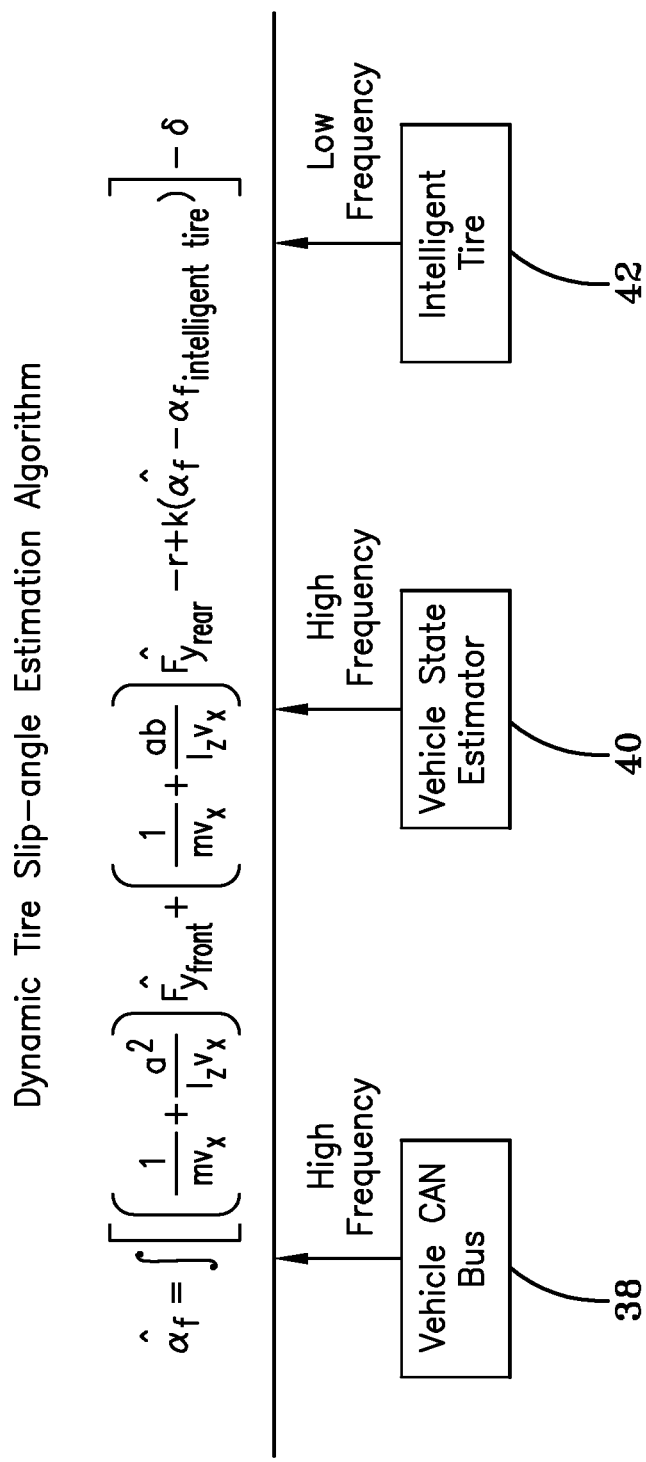

The axle force observer (Single Track Model) 20 shown diagrammatically in FIG. 3, is employed in a system which uses feedback to estimate tire slip angle for better accuracy. Such a system is represented in the dynamic slip angle algorithm represented in FIGS. 1A and 1B. Referring to FIGS. 1A and 1B, the CAN Bus 28 of an equipped vehicle 12 provides actual sensor measurement of Y variables including vehicle acceleration [ax, ay] and yaw rate [r]. An observer 34, such as a Luenberger observer or Kalman filter, predicts sensor measurements of [ax, ay, r] which are compared to actual sensor measurements of the Y variables at 30. Error is observed as a result of the comparison and a SMC Observer Feedback Gain 32 of "K" times the sign [Y measured-Y predicted] to the Observer 34 is made. The observer 34 further predicts tire axle force states $F_{yfront}$, $F_{yrear}$, $F_{xfront}$, and $F_{xrear}$. The observer 34 represents a set of mathematical equations that implement a predictor-corrector type estimator that is optimal in the sense that it minimizes the estimated error co-variance when some presumed conditions are met. Thus error between the predicted sensor measurements of [ax, ay, r] and actual sensor measurement via CAN Bus sensor is minimized as the predictive states of the tire axle forces is made.

As a result, the tire axle forces $F_{yfront}$, $F_{yrear}$, $F_{xfront}$, and $F_{xrear}$ are determined. The remainder of the Dynamic Tire Slip-angle Estimation Algorithm is given by the expression of FIG. 1B. The dynamic slip angle $\alpha_{predicted}$ of the front axle of the vehicle chassis is the integral of the bracketed expression minus the angle δ representing the road wheel handle angle.

The static load information described in co-pending U.S. application Ser. No. 13/609,695, incorporated herein, is used to yield the yaw moment of inertia $I_z$, mass "m", and the CG [center of gravity] distances (a, b) on a low frequency basis (once per revolution). The acceleration variables of Vx [vehicle velocity] and the axle force determination of $F_{yfront}$, $F_{yrear}$, $F_{xfront}$, and $F_{xrear}$ are obtained from the vehicle state estimator as explained previously in regard to FIG. 1A. The axle force estimations are thus available for incorporation into the expression of FIG. 1B on a high frequency basis. The intelligent tire provides static load information which may be used to generate a static (low frequency) slip angle determination, referred to herein as $\alpha_{f\,intelligent\,tire}$. Co-pending Patent Application U.S. Ser. No. 61/734,526 filed Dec. 7, 2012, incorporated herein, teaches the system and method for determining a static (low frequency) tire slip angle based on a comparison of the sidewall strain signals and tire static load estimations of U.S. application Ser. No. 13/609,695. The feedback term of $k(\alpha_{predicted}-\alpha_{f\,intelligent\,tire})$ is thus defined on a low frequency basis for use in the expression of FIG. 1B. Solving for dynamic slip angle $\alpha_{predicted}$ FIG. 1B can thus be made. FIG. 1B identifies the source of variable inputs; those accessed from the Vehicle CAN Bus 38, the Vehicle State Estimator 40, and the Intelligent Tire 42 and the relative frequency (high vs. low) in which such inputs are available.

Figure 2:
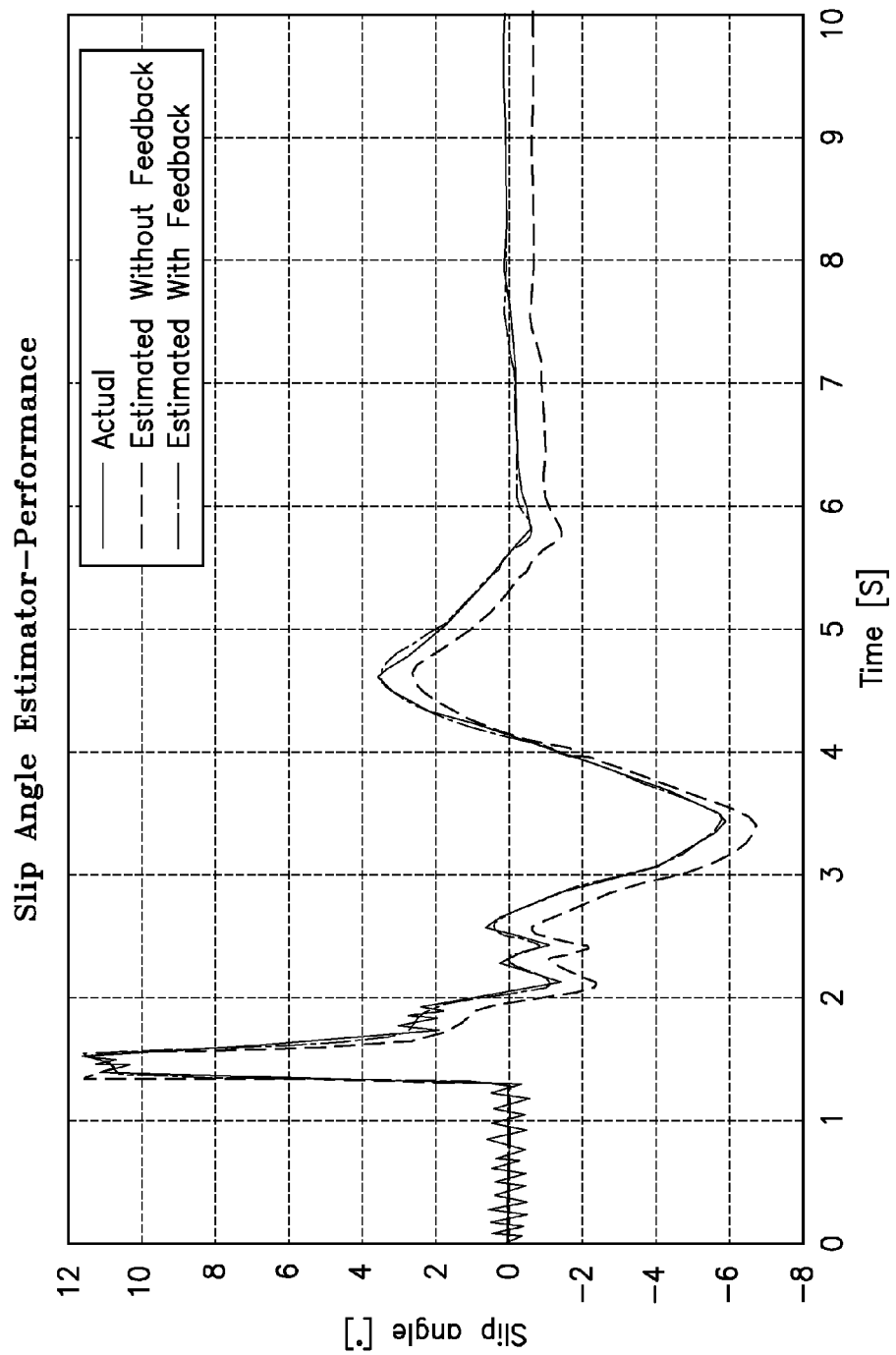
FIG. 2 is a graph of slip angle over time, showing actual slip angle, estimated slip angle without feedback, and estimated slip angle with feedback.

FIG. 2 shows a graph comparing actual slip angle to estimated slip angle without feedback and estimated slip angle with feedback. The improvement to slip angle estimation resulting from the use of the direct tire based slip angle measurement as feedback is demonstrated by the empirical comparison represented in FIG. 2.

Figure 5A:
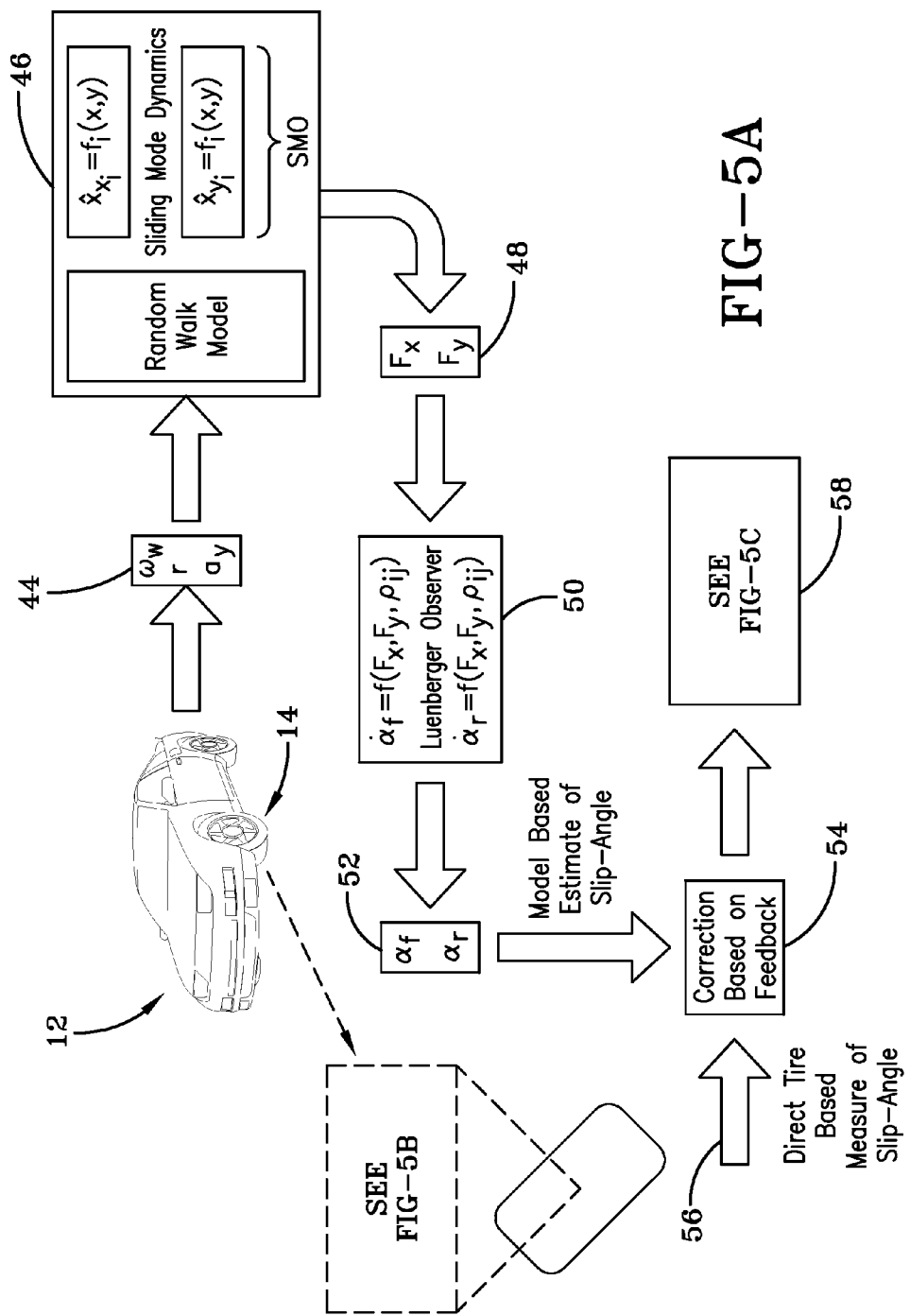
FIG. 5A is a block level diagram showing a system form comparing model based slip-angle estimates with tire based slip-angle estimations.
Figure 5B:
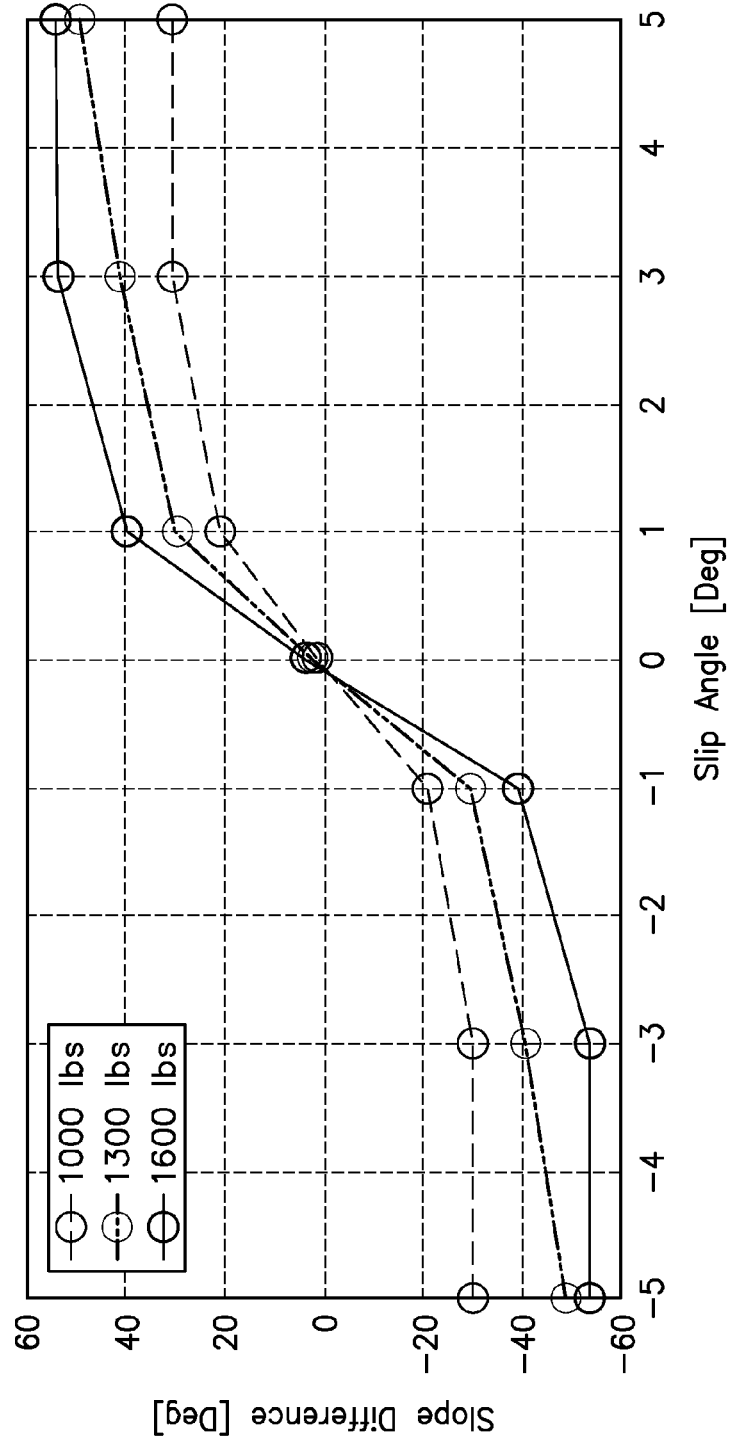
FIG. 5B is graph of the signal slope (based online signal processing algorithm analysis) vs. slip angle measurement for tire loads of 1000, 1300 and 1600 pounds.

Referring to FIGS. 5A through 5C, a system for comparing a model based estimate of slip-angle to tire based measure of slip-angle is shown. The vehicle 12 provides parameter measurement 44 of $a_x$ (longitudinal acceleration); r (yaw rate); and $a_y$ (lateral acceleration) through the CAN Bus to a random walk model 46. A "random walk" is a mathematical formulation of a path that consists of a succession of random steps. "Random walk" model 46 applies sliding mode dynamics to determine the forces $F_x$ and $F_y$ 48 which input into a Luenberger Observer 50 to generate model based estimates 52 of slip-angles $\alpha_f$ and $\alpha_r$ of the vehicle. With vehicle dynamics control systems, counter braking is applied at individual wheels as needed to generate an additional yaw moment until steering control and vehicle stability were regained. A sliding mode controller was designed to produce demanded yaw moment according to the error between the measured yaw rate and desired yaw rate. Vehicle dynamics control systems utilize the demanded yaw moment to calculate the brake torque on wheels respectively. With this control system, the vehicle can provide improved maneuverability and stability.

The model based slip angle estimates $\alpha_f$ and $\alpha_r$ are corrected using the direct tire based measurement of slip angle as a feedback parameter. With the feedback correction, the dynamic slip angle estimation is obtained. FIG. 5B shows a graph comparing slope difference [Deg] to slip angle [Deg] for three load conditions of 1000, 1300 and 1600 pounds. The slope difference is obtained from an online signal processing algorithm implemented based on the tire sidewall measurements. Such an algorithm is taught in co-pending U.S. Application Ser. No. 61/734,526 filed Dec. 7, 2012. The variation in slip angle estimated values based on slope differential under the three loading conditions is shown. In FIG. 5C, a graph comparing measured slip angle [α] tp estimated slip angle is shown, demonstrating the validity of the subject approach to slip angle estimation.

From the foregoing, it will be appreciated that a dynamic slip angle estimation system and method is provided for estimating a tire slip angle at high frequencies. The system includes vehicle sensor device(s) mounted to the vehicle for measuring and providing via the CAN Bus vehicle acceleration and yaw rate parameters; and load sensor(s) mounted to the vehicle tire for estimating a tire static load. From the tire static load estimate, the vehicle center of gravity longitudinal position and moment of inertia estimation is made. An observer is employed to predict vehicle tire axle forces from the estimated vehicle moment of inertia and measure vehicle acceleration. The vehicle tire axle forces estimated by the observer model are then applied with the vehicle center of gravity (determined by the tire static load estimation) and vehicle moment of inertia (determined by the tire static load estimation) in an algorithm providing dynamic slip angle estimation.

The system and method further performs its dynamic tire slip angle calculation using direct measurement of the tire slip angle as a feedback parameter useful in improving the accuracy of the resultant tire slip angle estimation.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A slip angle estimation system for estimating a tire slip angle comprising:
    at least one tire supporting a vehicle;
    at least one vehicle sensor mounted to the vehicle for providing measured vehicle acceleration and yaw rate parameters;
    at least one static load sensor mounted to the vehicle tire for providing a tire static load measurement;
    a tire slip angle estimation observer model for estimating a tire slip angle from the tire static load measurement, and the vehicle acceleration and yaw rate parameters.

2. The slip angle estimation system of claim 1, wherein further comprising:
    a center of gravity calculating model for calculating a vehicle center of gravity longitudinal position; and
    a vehicle moment of inertia calculating model for calculating a vehicle moment of inertia from the tire static load measurement.

3. The slip angle estimation system of claim 2, wherein the tire slip angle estimation model comprises an observer having as observed inputs the vehicle acceleration and the yaw rate parameters and the observer further having as an output tire axle forces based on the observed inputs.

4. The slip angle estimation system of claim 3, wherein the observer comprises an online nonlinear axle-force estimator.

5. The slip angle estimation system of claim 4, wherein the slip angle estimation model employs as a feedback parameter the direct tire slip angle measurement based on a comparison of the sidewall strain signals and tire static load estimation.

6. The slip angle estimation system of claim 5, wherein the static load estimation model generates the tire static load estimation from at least a first and at least a second strain sensing device mounted respectively to opposite sidewalls of the tire.

7. A slip angle estimation method for estimating a tire slip angle comprising:
    mounting at least one support tire to the vehicle;
    mounting at least one vehicle sensor to the vehicle for measuring vehicle acceleration and vehicle yaw rate;
    mounting at least one load sensor to the vehicle tire for measuring a tire static load;
    calculating a tire slip angle estimation based on the tire static load, the vehicle acceleration, and the vehicle yaw rate.

8. The tire slip angle estimation method of claim 7, wherein further comprising calculating a vehicle center of gravity and vehicle moment of inertia from the tire static load estimation.

9. The slip angle estimation method of claim 8, wherein further comprising utilizing an observer having as observed inputs the vehicle acceleration and the vehicle yaw rate and the observer producing as an output tire axle forces based on the observed inputs.

10. The slip angle estimation method of claim 9, wherein the observer comprises an online nonlinear axle-force estimator.

11. The slip angle estimation method of claim 10, using direct measurement of the tire slip angle as a feedback parameter useful in improving the accuracy of the resultant tire slip angle estimation.

* * * * *